United States Patent [19]

Mackay et al.

[11] 4,248,894

[45] Feb. 3, 1981

[54] LONG-LASTING FLAVORED CHEWING GUM CONTAINING NON-SUGAR SWEETENER CODRIED ON CHALK OR OTHER FILLER AND METHOD

[75] Inventors: Donald A. M. Mackay, Pleasantville, N.Y.; Abraham I. Bakal, Parsippany, N.J.; John J. Stroz, Monroe, Conn.

[73] Assignee: Life Savers, Inc., New York, N.Y.

[21] Appl. No.: 4,093

[22] Filed: Jan. 17, 1979

Related U.S. Application Data

[63] Continuation-in-part of Ser. No. 890,742, Mar. 27, 1978, abandoned, which is a continuation of Ser. No. 744,848, Nov. 24, 1976, abandoned.

[51] Int. Cl.³ .................................. A23G 3/30
[52] U.S. Cl. ........................................ 426/3; 426/548; 426/804
[58] Field of Search ..................... 426/3–6, 426/548, 804

[56] References Cited

U.S. PATENT DOCUMENTS

| | | | |
|---|---|---|---|
| 3,655,866 | 4/1972 | Bilotti | 426/3 |
| 3,795,744 | 3/1974 | Ogawa et al. | 426/3 |

*Primary Examiner*—Jeanette M. Hunter
*Attorney, Agent, or Firm*—Lawrence S. Levinson; Burton Rodney

[57] ABSTRACT

A long-lasting flavored chewing gum is provided which includes gum base, and a non-sugar sweetener, such as a saccharin sweetener, codried or coated on a filler material, such as calcium carbonate or starch. A method is also provided for preparing such chewing gum.

8 Claims, No Drawings

4,248,894

LONG-LASTING FLAVORED CHEWING GUM CONTAINING NON-SUGAR SWEETENER CODRIED ON CHALK OR OTHER FILLER AND METHOD

REFERENCE TO OTHER APPLICATIONS

This is a continuation-in-part of application Ser. No. 890,742 filed Mar. 27, 1978 now abandoned, which is a continuation of application Ser. No. 744,848, filed Nov. 24, 1976 now abandoned.

FIELD OF THE INVENTION

The present invention relates to a long-lasting flavored chewing gum which contains gum base, and a non-sugar sweetener, such as a saccharin sweetener, coated or codried with a filler, such as calcium carbonate, and to a method for preparing such gum.

BACKGROUND OF THE INVENTION

Conventional chewing gum generally includes gum base composed of ester gum, polyvinyl acetate, latex solids, fatty acids, natural and/or synthetic rubbers, waxes and texturizers and bulking agents, water-soluble flavoring and water-soluble sweeteners, for example, various sugars such as sucrose and dextrose, and/or artificial sweeteners such as sodium or calcium saccharin, cyclamates, dihydrochalcones, glycyrrhizin, glycyrrhizinates, emulsifiers such as lecithin, mono- and diglycerides, and flavors. Such gum initially provides a desirable strong sweet taste which declines rapidly during the first three to five minutes of chewing to a very slight, non-perceptible level of sweetness and flavor. The result is that after about five minutes of chewing all that remains in the mouth is an essentially tasteless wad which provides little in the way of flavor, aroma or sweetness. Accordingly, there clearly is a need and long-felt want for a chewing gum which possesses long-lasting flavor and sweetness.

DETAILED DESCRIPTION OF THE INVENTION

It has been found that the sweetness and flavor of chewing gums such as non-sour flavored (mint), fruit flavored and sour chewing gums can be prolonged by codrying or coating relatively small amounts of a non-sugar sweetener, such as a saccharin sweetener, with relatively large amounts of a filler, and then substantially uniformly dispersing such combination throughout the gum base. The non-sugar sweetener is thereby substantially bound up and retained in the gum base matrix and during chewing the non-sugar sweetener undergoes slow and controlled release into the saliva. The filler which also serves as a texturizer is substantially insoluble and thus is not released from the gum during chewing. In effect, the filler spreads out or increases the surface area of the non-sugar sweetener; thus when the codried combination is incorporated into a chewing gum, the release of the non-sugar sweetener from the gum is significantly slowed down. Furthermore, inasmuch as the non-sugar sweetener-filler combination is buried in the gum base and, as will be seen hereinafter, only very small amounts of the non-sugar sweetener are employed versus the relatively large amounts of filler, only the non-sugar sweetener is released upon chewing; the filler is substantially retained in the gum base even during chewing.

In a preferred embodiment of the invention, saccharin or aspartame sweetener is codried with calcium carbonate and/or magnesium trisilicate and the resulting combination is dispersed in the gum base.

It is well known that fine pulverization of crystals of poorly soluble materials or even slowly dissolving materials of good solubility increases surface area thereof, which, in turn, increases solubility rate. However, it has been surprisingly and unexpectedly found that finely divided artificial sweeteners, such as finely powdered free saccharin acid or finely powdered saccharin salts, when incorporated into chewing gum base do just the opposite; the extraction rate of such sweeteners from the gum base during chewing is reduced with decreasing particle sizes so that the sweet taste and flavor of the gum are prolonged. The reason for this effect would seem to be that at the finer particle sizes, the sweetener is more completely protected from contact with saliva by the gum base. This results in controlled release of sweetener and flavor from the gum base. The codrying or coating of the sweetener on the chalk or starch or other fillers has the effect of increasing surface area of the sweetener (and thus, in effect, reducing particle size thereof) thereby resulting in controlled release of sweetener.

The terms "coat", "coated", "coating", "codried, codrying" and these terms having other suffixes as employed herein are intended to refer to the incorporation in or application of the non-sugar sweetener to the filler by dissolution, dispersion, integration, encapsulation or any other conventional technique of physically combining the artificial non-sugar sweetener and filler.

Conventional chewing gum provides initially a very strong sweet taste which declines very rapidly in the first 3 or 4 minutes of chewing to only a slight, non-perceptible level of sweetness. The chewing gum of the present invention, on the other hand, which contains the non-sugar sweetener incorporated with the inorganic or organic filler component, provides a chewing gum whose sweetness corresponds to that of conventional gum for the first 3 minutes but, thereafter, begins to drop more slowly and stabilizes after about 5 minutes of chewing at a desirable sweetness level. This sweetness level remains essentially stable for 15 to 20 minutes. In the chewing gum of the invention, during the first few minutes of chewing, the perceived sweetness is due mostly to sugars or sugar alcohols, or soluble artificial sweeteners (not combined with the filler) present in the chewing gum. Thereafter, the non-sugar sweetner combined with the filler is released, flavor is stabilized and the sweet taste persists for extended periods of chewing of up to 20 minutes.

In view of the above, it will be appreciated that by incorporating the non-sugar sweetener with the filler, in accordance with the invention, the initial sweetness impact of the sweetener is reduced or delayed. Thus, the sweetener incorporated in the filler may be used in sugar or sugar alcohol or artificial soluble sweetener-containing chewing gums where a second burst of sweetness from the non-sugar sweetener-filler combination is desired to produce a long-lasting flavored gum which will not have the overpowering sweetness which would normally result where uncoated sweeteners and sugar are employed together.

In forming the non-sugar sweetener combination with the filler, the non-sugar sweetener will be employed in a weight ratio to the filler of within the range of from about 1:100 to about 1:1, and preferably from about 1:100 to about 1:10, so as to provide a concentration of non-sugar sweetener in the filler preferably within the range of from about 1% by weight of the filler.

The non-sugar sweetener combined with the filler as discussed below will be present in the chewing gum in an amount within the range of from about 3 to about 0.2% and preferably from about 3% to about 0.5% by weight of the gum base, and will be present in the finished chewing gum in amounts ranging from about 1% to about 0.04% and preferably from about 0.6% to about 0.1%. Examples of non-sugar sweeteners suitable for use herein to be codried or coated on the filler include free saccharin acid (free saccharin acid may react with chalk to produce calcium saccharin), sodium, calcium or ammonium saccharin, sugar alcohols such as xylitol, sorbitol, mannitol or maltitol, cyclamate salts, dihydrochalcones, glycyrrhizic acid and salts, L-aspartyl-L-phenylalanine methyl ester (aspartame) and mixtures thereof.

The filler which is combined with the non-sugar sweetener will be present in the gum in an amount within the range of from about 5 to about 95% by weight of the gum base and preferably in an amount within the range of from about 10 to about 30%. Examples of fillers suitable for use herein include inorganic fillers such as calcium carbonate, magnesium trisilicate, talc, diatomaceous earth, aluminum oxide and mixtures thereof.

It will be understood that the non-sugar sweetener may be codried, coated, incorporated, entrapped, dissolved, dispersed, or otherwise combined with the filler employing conventional coating, drying or encapsulation technology. In one embodiment, the non-sugar sweetener (e.g., Ca or Na saccharin salt) is dispersed (and preferably solubilized) in water, and mixed with filler such as chalk to form a uniform paste which is then dried and ground to a powder, for example less than 50 mesh, and preferably less than 100 mesh. The powder can then be incorporated with the gum base components or mixed with the gum base as will be described hereinafter together with other conventional chewing gum components to form a chewing gum.

It will also be appreciated that the non-sugar sweetener-filler combination of the invention may be employed in chewing gum which includes sugar and/or other uncoated artificial water-soluble or poorly water-soluble sweeteners such as free saccharin, saccharin salts, cyclamates, aspartame, glycyrrhizinates, dihydrochalcones and the like.

In general, the gum base is prepared by heating and blending various ingredients, such as natural gums, synthetic resins, waxes, plasticizers, etc., in a manner well known in the art. Typical examples of the ingredients found in a chewing gum base are masticatory substances of synthetic origin such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum. However, other solvents may be employed such as pentaerythritol ester gum, polymerized ester gum, and ester gum. The solvent will be employed in an amount ranging from about 10 to about 40%, preferably from about 18 to about 30%, and optimally from about 20 to about 25% by weight of the gum base.

The gum base may also include a hydrophilic-type detackifier which will sorb saliva and become slippery and is incompatible with the elastomer and solvent for the elastomer. Examples of such materials suitable for use herein will include vinyl polymers having a molecular weight of not less than 2000, such as polyvinyl acetate, polyvinyl butyl ether, copolymers of vinyl esters and vinyl ethers. It will be appreciated that the chalk or any other material which may be present in the gum base will not serve the function of the inorganic or organic filler coating agent for the nonsugar sweetener and that such filler must be separately combined with the non-sugar sweetener; however, this fraction of the gum base may be used for this purpose by combining the chalk or other filler with the sweetener prior to its incorporation in the gum base.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like. The hard waxes will be employed in an amount within the range of from about 0 to about 50% by weight of the gum base, preferably from about 17 to about 40%, and optimally from about 20 to 30% by weight. The preferred hard waxes are candelilla wax and paraffin wax employed in combination so that from 2 to about 8% (based on the weight of the gum base) of the candelilla is employed with from about 15 to about 30% (based on the weight of the gum base) of the paraffin wax. The waxes are found to reduce the tackiness of the final gum composition without significantly reducing cohesivity thereof.

The hydrophilic-type detackifier will be employed in an amount within the range of from about 20 to about 40% by weight of the gum base, preferably from about 25 to about 35%, and optimally from about 28 to about 32% by weight of the gum base.

The gum base may also include a softening agent and lubricant combination which may comprise one or more hydrogenated vegetable or animal fats having a high melting point, that is above about 22° C., and preferably above about 50° C.; such softening agent and/or lubricant may be employed in amounts ranging from about 0 to about 15% by weight of the gum base, preferably from about 4 to about 12%, and optimally from about 5 to about 10%.

The gum base will also include an emulsifier to impart hydrophilic properties to the gum base so that saliva will be absorbed thereby making the gum base slippery; the emulsifier will be employed in amounts ranging from about 2 to about 12% by weight of the gum base, preferably from about 3 to about 8%, and optimally from about 5 to about 7%. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to about 2000 ppm of the gum base, such as butylated hydroxyanisole, butylated hydroxytoluene, and propyl gallate.

The gum base may also contain particles of chalk (CaCO)$_3$ as a bulking agent and texturizer (not combined with the non-sugar sweetener) in amounts ranging from about 0 to about 50%, and preferably from about 0.2 to about 25% by weight of the gum base.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I |  |
| Ester gum | 58 |
| Chalk | 30 |
| Rubber latex solids | 10 |
| Lecithin | 2 |
| Base II |  |
| Ester gum | 88 |
| Rubber latex solids | 10 |
| Lecithin | 2 |
| Base III |  |
| Chicle | 20 |
| Jelutong | 40 |
| Gutta soh | 8.5 |
| Lecithin | 2 |
| Chalk | 2 |
| Base IV |  |
| Partially oxidized chicle | 68 |
| Lecithin | 2 |
| Chalk | 30 |
| Base V |  |
| Jelutong (dry) | 60 |
| Gutta siak | 13 |
| Lecithin | 2 |
| Chalk | 25 |

The chewing gum of the invention may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

The chewing gum of the invention will optionally, and preferably, include an easily extractable or water-soluble sweetener, the easily extractable sweetener being present in an amount ranging from about 90 to about 0.05%, preferably from about 90 to about 40% by weight of the final product to provide an initial burst of sweetness. Such water-soluble sweeteners may include one or more sugars, sugar alcohols, or sugar containing material, for example, monosaccharides, disaccharides and polysaccharides, some examples of which follow:

A. Monosaccharides of 5 or 6 carbon atoms—arabinose, xylose, ribose, glucose, mannose, galactose, fructose, dextrose, or sorbose or mixtures of two or more of the foregoing monosaccharides.

B. Disaccharides—sucrose such as cane or beet sugar, lactose, maltose or cellobiose; and C. Polysaccharides—partially hydrolyzed starch, dextrin or corn syrup solids.

The sugar alcohols include sorbitol, xylitol or mannitol.

In one embodiment, sorbitol will be included in combination with sugar as the water-soluble sweetener. In such case, the sorbitol will be present in an amount within the range of from about 2 to about 20% by weight of the chewing gum composition, preferably from about 5 to about 15%, and optimally from about 8 to about 12%.

Furthermore, any of the water-soluble artificial or natural sweeteners set out hereinbefore may be present together with the non-sugar sweetener combined with the filler. In each of the preferred embodiments of the chewing gum and method of the invention, corn syrup will be employed as the plasticizer. However, satisfactory results may be obtained, for example, by employing sorbitol syrups, modified starches and the like, without the use of and presence of corn syrup in the chewing gum.

The method for forming a long-lasting flavored gum includes the steps of admixing melted gum base containing the filler-non sugar sweetener combination dispersed therein with a plasticizer such as a syrupy substance such as corn syrup or a modified starch syrup or sorbitol syrups and emulsifier such as lecithin, at a temperature ranging from about 180° to about 210° F., to form a base-syrup mix, and (where desired) adding flavor oil, sugar, sorbitol, and other flavor to the mix with stirring. The resulting mix is then formed into sticks or tablets of chewing gum employing conventional techniques.

The following Examples represent preferred embodiments of the present invention. All temperatures are expressed in °F.

EXAMPLE 1

Fifteen grams of sodium saccharin is solubilized in 100 ml of distilled water. The saccharin solution is added to 270 g of chalk while mixing to form a uniform paste. The mixed paste is dried to remove the moisture and ground into a powder passing a sieve of 100 mesh.

An amount of 1230 g of gum base containing 88 parts ester gum, 10 parts rubber latex solids, and 2 parts lecithin is melted in a jacketed sigma mixer and 285 g of the chalk and sodium saccharin are added. The mass is mixed thoroughly for 30 minutes while maintaining the temperature at 140° to 180° F. The chalk and saccharin containing gum base is removed from the mixer and cooled.

The sodium saccharin is extracted from the gum base in accordance with the following procedure.

An aliquot of 40 g of the gum base is taken and mixed thoroughly in a Waring blender with 200 ml of distilled water. During mixing, the gum base is reduced in size to a powder form so that an intimate contact is maintained between the gum base and the water. After 5 minutes of mixing, gum base is separated from the water by filtration and the aqueous filtrate is analyzed for sodium saccharin using a standard UV absorbance method. The gum base is extracted again with 200 ml of distilled water for another 5 minutes and the aqueous portion separated and the sodium saccharin content determined. This same procedure is repeated until four extractions are made. Results are summarized below.

| Water Extract | Cumulative Time (min.) | Percent of Original Saccharin Extracted in Each Water Extract | Cumulative Percent of Original Saccharin Extracted |
|---|---|---|---|
| 1st | 5 | 11.6 | 11.6 |
| 2nd | 10 | 8.2 | 19.8 |
| 3rd | 15 | 5.3 | 25.1 |
| 4th | 20 | 6.0 | 31.1 |

Control A

In order to evaluate the retention of sodium saccharin in gum bases a gum base is prepared containing 88 parts ester gum, 10 parts rubber latex solids, 2 parts lecithin. 1.5 Kg of gum base is melted in a jacketed sigma blade mixer. To this base 15 g of sodium saccharin of a particle size of less than 471 microns and more than 337 microns are added. The gum base is then mixed thoroughly for 30 minutes while maintaining the temperature between 140° and 180° F.

The gum base is removed from the sigma blade mixer, cooled and stored.

The sodium saccharin is then extracted from the gum base using the procedure outlined in Example 1.

Results are summarized below.

| Water Extract | Cumulative Time (min.) | Percent of Original Saccharin Extracted in Each Water Extract | Cumulative Percent of Original Saccharin Extracted |
|---|---|---|---|
| 1st | 5 | 67.7 | 67.7 |
| 2nd | 10 | 13.6 | 81.3 |
| 3rd | 15 | 5.1 | 86.4 |
| 4th | 20 | 2.4 | 88.8 |

Thus, after the first five minutes, more than half of the original saccharin is extracted to the water phase.

A comparison of the data of Example 1 and Control A clearly indicate that the extraction rate of saccharin from the gum base is slowed down by co-drying of saccharin on chalk.

EXAMPLE 2

Fifteen grams of sodium saccharin is solubilized in 100 ml of distilled water. The solution is added to 135 g of chalk and 135 g of magnesium trisilicate and mixed thoroughly to a smooth paste. The paste is dried and the dry solids are pulverized and passed through a 100 mesh sieve. An amount of 285 g of this mixture is added to 1230 g of gum base containing 88 parts ester gum, 10 parts rubber latex solids, 2 parts lecithin. The preparation of gum base and extraction are carried out as outlined in Example 1.

Extraction data are as follows:

| Water Extract | Cumulative Time (min.) | Percent of Original Saccharin Extracted in Each Water Extract | Cumulative Percent of Original Saccharin Extracted |
|---|---|---|---|
| 1st | 5 | 19.7 | 19.7 |
| 2nd | 10 | 19.7 | 39.4 |
| 3rd | 15 | 13.6 | 53.0 |
| 4th | 20 | 7.8 | 60.8 |

EXAMPLE 3

A chewing gum is prepared using the gum base described in Example 1. The chewing gum composition is as follows:

|  | Parts by Weight |
|---|---|
| Gum base (containing sodium saccharin co-dried on chalk as per Example 1) | 21 |
| Corn syrup | 17 |
| Sugar | 49.8 |
| Sorbitol | 10 |
| Artificial flavor | 1 |
| Gum arabic coated flavor | 1 |
| Lecithin | 0.2 |

In preparing the above composition, the gum base is melted and the corn syrup and lecithin are added and mixed. The artificial flavor is added and mixed for 3 minutes, and the sugar is added and mixed for an additional 3 minutes. The sorbitol is then added, mixed for 2 minutes, and the gum arabic coated flavor is added, mixed for one minute. The mass is removed from the kettle, rolled and cut into desired shapes.

Chewing gum prepared by this method is chewed for 5 minutes and the residual saccharin in the bolus is compared with that of commercial sugar-free gums after the same length of chewing.

The saccharin is extracted from the bolus and measured using a standard UV spectrometric technique. Results are as follows:

Percent of original saccharin retained in bolus of sugar-free commercial gums after 5 minutes of chewing = 7.8%.

Percent of original sodium saccharin retained in bolus of the Example 3 gum after 5 minutes of chewing = 10.1%.

EXAMPLE 4

Twenty-five grams of sodium saccharin are solubilized in approximately 500 g of water. To this solution 500 g of acid modified, thin cooking corn starch (Flojel 65 "National Starch and Chemical Corp.") are added and thoroughly mixed to produce a uniform paste. The paste is frozen and then freeze-dried. The dried material is ground in a laboratory grinder to pass 100 mesh sieve.

Three hundred eighty-two grams of the starch containing the co-dried sodium saccharin are intimately mixed with 1922 grams of melted gum base while the temperature is maintained at 180° F. In order to affect uniform distribution, mixing is continued for 15 minutes. This gum base contains 1.0% sodium saccharin.

The gum base is used to prepare a chewing gum according to the following composition:

|  | Parts by Weight |
|---|---|
| Gum base (containing sodium saccharin co-dried with starch) | 22 |
| Sugar | 48.8 |
| Corn syrup | 17 |
| Sorbitol | 10 |
| Lecithin | 0.2 |
| Spearmint flavor oil | 1 |
| Spearmint spray-dried flavor | 1 |

The gum base is melted and cooled to 180° F. To this the corn syrup and lecithin are added and mixed for 2 minutes. The flavor oil is then added and the mass is mixed for 3 minutes. The sugar is added and mixed, followed by the addition of sorbitol and the spray-dried flavor.

The chewing gum is removed from the kettle, rolled, scored and cut into sticks.

The above chewing gum is presented to an Expert Sensory Panel.

For comparison, the panel is given a control gum (Control B) prepared in the same fashion, only the sodium saccharin is merely pre-mixed with starch prior to its incorporation into the gum base.

The panel is presented with coded samples of the Control B and Example 4 gums. The testing procedure is as follows.

Panelists chew one of the gums for 5 minutes, at which time the bolus is removed and put aside in a paper cup. Panelists then chew the other gums for the same length of time and put the boluses in another cup.

Panelists then rinse their mouths with water and consume crackers to remove residual flavor in the oral cavity. This rinsing and rest period lasts one minute. Then panelists taste each of the boluses and rate the level of sweetness and flavor on 0-8 hedonic scale.

This same procedure is repeated after 10, 15 and 20 minutes of chewing.

For the purpose of this test, the quality attributes are defined as follows:

Sweetness: The sweet sensation perceived in the oral cavity by the taste buds.

Overall Flavor: The overall flavor sensation perceived in the oral cavity.

The scale used is described as follows:
0—none
2—perceptible
4—definite
6—strong
8—very strong Average scores of Example 4 and Control B gums are summarized below:

|  |  | Time (min.) | | | |
|---|---|---|---|---|---|
|  |  | 5 | 10 | 15 | 20 |
| Example | Sweetness | 4.6 | 3.4 | 2.0 | 1.2 |
| Gum | Overall Flavor | 4.2 | 3.2 | 1.8 | 1.1 |
| Control B | Sweetness | 3.6 | 2.4 | 1.2 | 0.5 |
| Gum | Overall Flavor | 3.4 | 2.4 | 1.1 | 0.6 |

The data are subjected to statistical analysis which indicates that the Example 4 gum has significantly longer sweetness and flavor duration than the Control B gum.

What is claimed is:

1. A method for forming a long-lasting flavored chewing gum, which comprises codrying or coating a non-sugar sweetener selected from the group consisting of a saccharin sweetener or aspartame, with an inorganic filler selected from the group consisting of calcium carbonate, talc, magnesium trisilicate, diatomaceous earth, aluminum oxide or mixtures thereof, said non-sugar sweetener being employed in a weight ratio to the filler of from about 1:100 to about 1:10, combining the resulting combination with melted gum base ingredients to form a gum base, the non-sugar sweetener-filler combination being substantially uniformly dispersed througout and bound up in the gum base matrix, and mixing the gum base containing the non-sugar sweetener-filler combination with one or more flavors, sweeteners, emulsifiers and plasticizers to form a chewing gum wherein said inorganic filler and gum base provides a carrier for the non-sugar sweetener to control and slow release of said non-sugar sweetener from the gum base while substantially all of said filler remains in said gum base and is not released with said non-sugar sweetener.

2. The method as defined in claim 1 wherein said saccharin sweetener comprises the free acid form of saccharin.

3. The method as defined in claim 1 wherein said saccharin sweetener comprises sodium saccharin, calcium saccharin or ammonium saccharin.

4. The method as defined in claim 1 wherein said filler is calcium carbonate or magnesium trisilicate.

5. The method as defined in claim 1 wherein said saccharin or aspartame sweetener is present in an amount within the range of from about 0.002 to about 2% by weight of the chewing gum.

6. The method as defined in claim 1 wherein the filler combined with the non-sugar sweetener is present in an amount within the range of from about 15 to about 30% by weight of the gum base.

7. The method as defined in claim 1 wherein said filler is calcium carbonate.

8. A flavored chewing gum having a prolonged sweet taste prepared by the method as defined in claim 1.

* * * * *